Feb. 4, 1969 G. STRACHANOW 3,426,244
HORIZONTAL DEFLECTION SYSTEM
Filed April 28, 1966
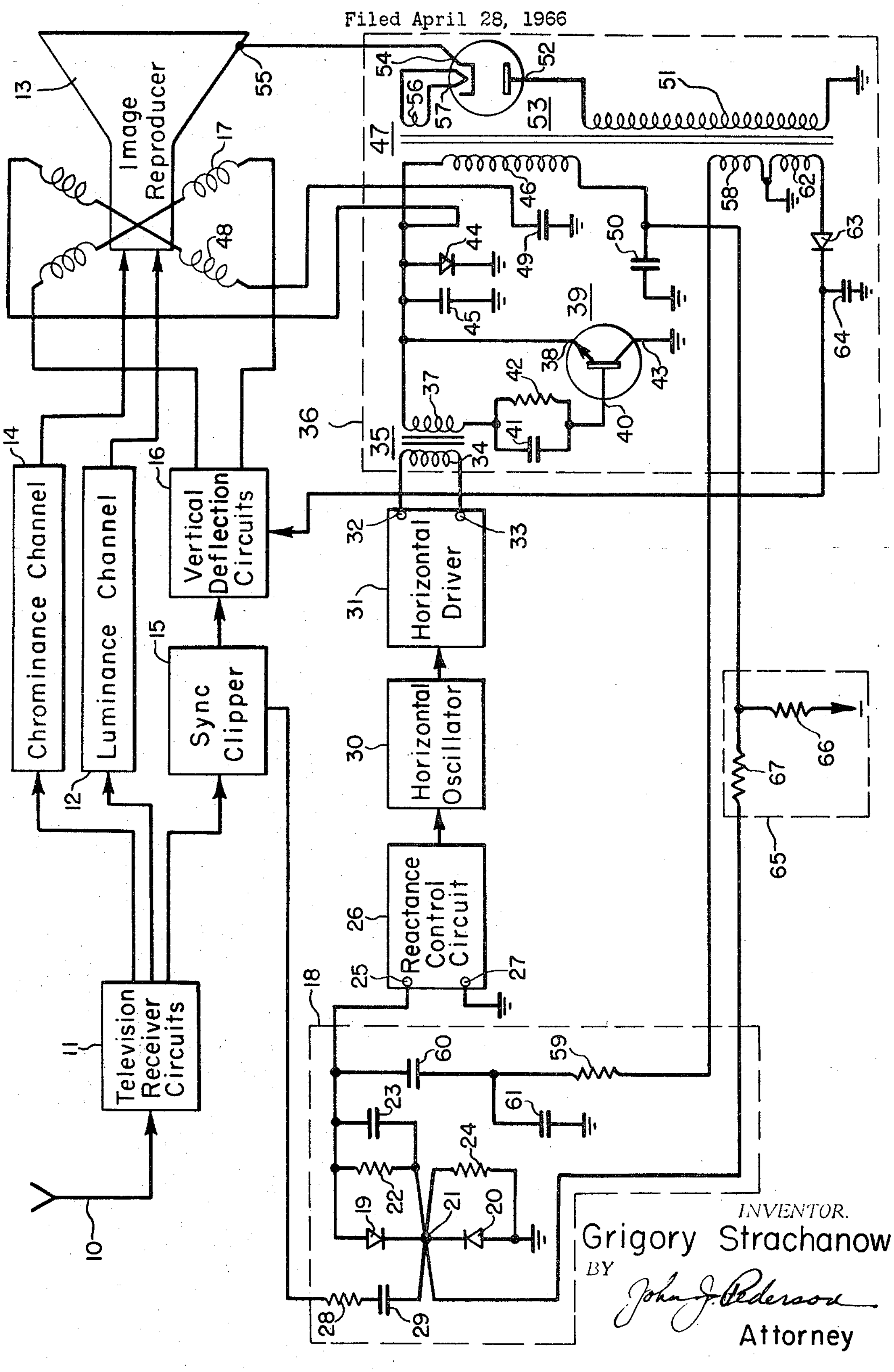
INVENTOR.
Grigory Strachanow
BY
John J. Pederson
Attorney United States Patent Office 3,426,244
Patented Feb. 4, 1969

1 2

3,426,244

HORIZONTAL DEFLECTION SYSTEM

Grigory Strachanow, Des Plaines, Ill., assignor to Zenith Radio Corporation, Chicago, Ill., a corporation of Delaware Filed Apr. 28, 1966, Ser. No. 545,974
U.S. Cl. 315—27 6 Claims
Int. Cl. H01j 29/70

ABSTRACT OF THE DISCLOSURE

A reaction-scanning type horizontal deflection system which produces in a television receiver having an unregulated sweep-excited high-voltage power supply for supplying accelerating potential to its image reproducer a raster of substantially constant width and lateral position regardless of brightness variations in the reproduced image. The system includes synchronizing circuitry which maintains synchronism between the transmitted and reproduced images by comparing the phase of received sync pulses with comparison pulses derived from the horizontal deflection output stage. A resistor series-connected between the receiver power supply and the output stage develops a control voltage which is applied to the synchronizing circuitry to counteract the raster shift which would otherwise result from changes in the width of the comparison pulses brought about by load variations imposed on the output stage by the sweep-excited high voltage power supply with brightness variations in the reproduced image. The series resistor also compensates for raster width variations by reducing the available operating current to the output stage during high-brightness low-high voltage conditions. The system is more economical to manufacture than previous designs because it obviates the need for a costly high voltage regulator stage.

The present invention relates to improvements in horizontal deflection systems for television receivers, and more particularly, to means for maintaining the image reproduced by a cathode-ray tube substantially constant in size and position regardless of fluctuations in accelerating potential.

Cathode-ray tubes of the type commonly used for image reproduction in present day color television receivers require an accelerating potential in the order of 25,000 volts. Although an accelerating potential of this magnitude can be generated by a conventional power supply operable from the alternating-current line, for reasons of economy it has become standard practice to instead utilize a power supply excited by the output stage of the horizontal deflection system. Such sweep-excited power supplies, while offering economy by obviating the need for expensive transformers and filters, have undesirably poor voltage regulation under conditions of varying load. Unfortunately, the cathode-ray tube image reproducer now in universal use presents a widely varying load to its power supply as the image being reproduced undergoes brightness level variations. This is especially true in color television receivers where the image reproducer must be brightness-responsive to the direct-current as well as the alternating-current components of the television transmission.

Prior-art color television receivers have utilized a high voltage regulator to maintain the cathode-ray tube accelerating potential constant. Such high voltage regulators are costly and their elimination has long been sought as a way of achieving a significant economy in mass-produced color television receivers. One factor which heretofore prevented use of an unregulated high voltage power supply was that the reproduced image increased in size with increased brightness and decreased accelerating potential. This was a result of the cathode-ray tube electron beam becoming "softer" or easier to deflect at lower accelerating potentials. This size change, commonly known as blooming, can be reduced or eliminated by relating the applied horizontal and vertical deflection signals to the cathode-ray tube accelerating potential, so that as the accelerating potential decreases the deflection signals decrease. One aspect of the present invention is directed to a novel horizontal deflection system for a cathode-ray tube which maintains constant width by proportioning the applied horizontal deflection signal to the brightness level, and hence to the accelerating potential, of the tube.

Another factor which heretofore prevented the use of unregulated high voltage power supplies was that the raster suffered lateral shifts in position with brightness variations in the reproduced image. To understand the reasons for these shifts it is necessary to consider the operation of the horizontal deflection system. The horizontal deflection system of present-day television receivers customarily includes an oscillator which must be maintained in phase and frequency synchronism with the received television transmission for proper reproduction of the transmitted image. This is usually accomplished by means of a phase comparison circuit which compares a comparison pulse phase-related to the horizontal scanning signal with a synchronizing signal derved from the receved television transmission. Any phase dfference results in the generation of an error potential which is applied to a reactance control tube or other type of phase control circuit to shift the horizontal oscillator back into phase synchronism.

In practice the comparison pulse is derived from the horizontal sweep output stage which, it will be recalled, has the secondary function of energizing the high voltage power supply. It will further be recalled that this power supply is subject to wide variations in loading as a result of brightness variations in the reproduced image. These loading variations are reflected back to the horizontal output stage and manifested as variations in retrace time, and hence as variations in the width of the comparison pulse. The phase detector circuit undesirably responds to these width variations by generating false error voltages which cause unnecessary phase shifts in the horizontal oscillator. The viewer sees these phase shifts as annoying lateral shifts in the position of the reproduced image. A second aspect of the invention, therefore, is directed to a novel compensating circuit which maintains the position of the reproduced image constant regardless of variations in brightness level.

It is a general object of my invention, therefore, to provide a new and improved horizontal deflection system for use in conjunction with a television receiver having an unregulated high voltage power supply.

It is a more specific object of the invention to provide a horizontal deflection system for use in conjunction with a cathode-ray tube image reproducer having an unregulated high voltage power supply wherein brightness variations in the reproduced image have a minimal effect on the lateral position of the reproduced image.

It is another object of the invention to provide a horizontal deflection system for use in conjunction with a cathode-ray tube image reproducer having an unregulated high voltage power supply wherein brightness variations in the reproduced image have a minimal effect on the width of the reproduced image.

Accordingly, the invention is directed to a horizontal deflection system for use in a television receiver or the like adapted to receive composite television transmissions including horizontal synchronizing signals. The system includes an image reproducer operable from an applied accelerating potential for reproducing an image having a predetermined range of brightness levels and having an ultor circuit in which the current varies directly with the brightness level of the reproduced image. A high voltage power supply operable from an impressed horizontal deflection signal is included for generating the accelerating potential for application to the ultor circuit of the image reproducer. Further included is a horizontal sweep output stage for generating a horizontal deflection signal for application to the high voltage power supply. Means coupled to the horizontal sweep output stage are provided for deriving comparison pulses which are phase-dependent on the deflection signals but undesirably width-dependent on the current in the ultor circuit. Further included are means comprising a phase detector circuit for generating a control effect representing the phase difference between the received synchronizing signals and the derived comparison pulses but undesirably dependent on width variations in the comparison pulses. Compensating means responsive to the current level in the ultor circuit are included for modifying the operation of the phase detector to render the control effect therefrom substantially independent of the comparison pulse width variations. Synchronizing means coupled to the horizontal sweep output stage and responsive to the compensated control effect are further included for maintaining the horizontal deflection signal in frequency and phase synchronism with the received composite television transmissions.

The features of the present invention which are believed to be novel are set forth with particularity in the appended claims. The invention, together with further objects and advantages thereof, may best be understood by reference to the following desecription taken in connection with the accompanying drawing, in which the single figure is a detailed schematic diagram of a television receiver having a horizontal deflection system constructed in accordance with the invention.

The television receiver shown in the figure comprises an antenna 10 coupled to television receiving circuits 11, which include conventional translating, amplifying and detecting stages for deriving a composite video-frequency signal from a received television transmission. One composite signal output of receiving circuits 11 is coupled to a luminance channel 12 which, in turn, is coupled to a color image reproducer 13. Another output of receiving circuits 11 is coupled to a chrominance channel 14 which includes appropriate chrominance demodulator circuitry for deriving a chrominance output signal. The chrominance output signal of chrominance channel 14 is coupled to image reproducer 13, which, in this case, is a standard three gun shadow mask cathode-ray tube. A third composite signal output from television receiving circuits 11 is coupled to a sync clipper 15 wherein horizontal and vertical synchronizing information is derived for use in synchronizing the image reproducer deflection circuits. Vertical synchronizing information for sync clipper 15 is coupled to a vertical deflection circuit 16, wherein a vertical deflection output signal is generated and applied to a vertical deflection coil 17 of image reproducer 13.

Horizontal synchronizing information from sync clipper 15 is applied to a conventional phase detector circuit 18, which is part of the receiver horizontal deflection system. Phase detector 18 comprises a pair of unidirectional diodes 19 and 20 which have their cathodes joined at a juncture 21. Diode 19 is shunted by the parallel combination of a resistor 22 and a capacitor 23, and diode 20 is shunted by a resistor 24. The anode of diode 20 is grounded and the anode of diode 19 is connected to one input terminal 25 of a reactance control circuit 26. The other input terminal 27 of circuit 26 is grounded. The horizontal synchronizing information derived by sync clipper 15 is coupled to juncture 21 by a circuit serially including a resistor 28 and a capacitor 29. Reactance control stage 26 is coupled to a horizontal oscillator 30 which, in turn, is coupled to a horizontal driver stage 31.

Horizontal driver stage 31 has a pair of output terminals 32 and 33 across which is connected the primary winding 34 of an interstage coupling transformer 35. This transformer serves as an input transformer to the horizontal sweep output and sweep-excited high voltage power supply stages enclosed by dashed outline 36, and includes a secondary winding 37 which has one terminal connected to the emitter 38 of a transistor 39. The other terminal of winding 37 is connected to the base 40 of transistor 39 through the parallel combination of a capacitor 41 and resistor 42. The collector 43 of transistor 39 is connected to the gound, and emitter 38 is further connected to the anode of a diode 44, to one terminal of a capacitor 45, to one terminal of the primary winding 46 of flyback transformer 47, and to the horizontal deflection winding 48 of image reproducer 13. The remaining terminals of capacitor 45 and diode 44 are connected to ground. The remaining terminal of deflection winding 48 is connected to ground by a capacitor 49 and the remaining terminal of primary winding 46 is coupled to a negative undirectional current source, designated by the symbol (—), and by-passed to ground by a capacitor 50.

A secondary winding 51 on fly-back transformer 47 has one terminal connected to the anode 52 of a high voltage rectifier 53. The other terminal of winding 51 is grounded, and the cathode 54 of rectifier 53 is connected to the ultor electrode 55 of image reproducer 13. A second secondary winding 56 of transformer 47 is connected to the heater element 57 of rectifier 53. A third secondary winding 58 of transformer 47 has one terminal connected by a circuit serially comprising a resistor 59 and a capacitor 60 to the anode of phase detector diode 19. The juncture of resistor 59 and capacitor 60 is connected to ground by a capacitor 61, and the remaining terminal of secondary winding 58 is grounded. Fly-back transformer 47 has a fourth secondary winding 62 which has one of its terminals connected to the anode of a diode 63 and its other terminal connected to ground. The cathode of diode 63 is shunted to ground by filter capacitor 64, and the voltage developed at the juncture of diode 63 and capacitor 64 is applied to an input terminal of vertical deflection circuit 16 provided for controlling the magnitude of the vertical deflection signal applied to vertical deflection winding 17.

As thus far described, the receiver is entirely conventional in design and accordingly only a brief description of its operation need be given here. A radio-frequency signal is intercepted by antenna 10 and amplified and translated to a composite video-frequency signal by conventional television receiving circuits 11. The composite signal includes luminance, chrominance, and synchronizing components which convey all information necessary for reproduction of the televised image. The luminance component, which represents brightness information in the televised image, is amplified in luminance channel 12 and applied to image reproducer 13. The chrominance component, after demodulation and amplification in chrominance channel 14, is applied in the form of color-difference signals to image reproducer 13. The concurrently applied luminance and color-difference signals matrix in image reproducer 13 to produce an image having brightness, hue and color saturation characteristics corresponding to the televised image.

Synchronizing information, in the form of horizontal and vertical sync pulses, is separated from the composite signal by sync clipper 15. Vertical deflection circuit 16 utilizes these separated vertical sync pulses to generate a synchronized vertical deflection signal in vertical deflection winding 17. For reasons which will be discussed shortly, the amplitude of this deflection signal varies directly with the voltage developed at the juncture of diode 63 and capacitor 64 in horizontal output stage 65.

The horizonal oscillator 30 included in the receiver horizontal deflection system may comprise any one of a number of well known sinewave oscillator circuits adapted to operate at the hnrizontal scanning frequency. The output of oscillator 30, after amplification and waveshaping in horizontal driver stage 31, appears as a horizontal-rate squarewave of approximately 80 volts peak-to-peak at terminals 32 and 33. Interstage transformer 35 impresses this signal across the base 40 and emitter 38 of transistor 39 through the parallel combination of capacitor 41 and resistor 42, which serve as a conventional wave-shaping network. Transistor 39 is energized by a negative unidirectional current source through an output circuit which serially includes primary winding 46 of fly-back transformer 47, and the impressed horizontal-rate square wave recurrently switches transistor 39 to develop a series of recurrent negative retrace pulses at emitter 38. These pulses, which in practice are approximately 500 volts peak-to-peak, excite an oscillation in horizontal deflection winding 48 which, combined with the damping action of diode 44, results in the generation of a sawtooth deflection signal in the output circuit of transistor 39. The details of this circuit are well known to the art, and consequently it will suffice to say that damper capacitor 45 and primary winding 46 also affect the generation of this sawtooth deflection signal. Capacitor 49 serves as a DC blocking capacitor to winding 48 and has sufficient capacity so that it does not interfere with the sawtooth scanning current in deflection winding 48.

Fly-back transformer 47 includes a step-up secondary winding 51 and the negative pulses applied to primary winding 46 induce positive pulses in this winding having peak amplitudes in excess of 25,000 volts. These pulses are rectified by rectifier 53 before application to the ultor electrode 55 of image reproducer 13. The internal capacitance of image reproducer 13 provides sufficient filtering for maintaining the positive direct-current potential on the ultor electrode at approximately 25,000 volts. Secondary winding 56 is included for energizing the heater 57 of rectifier 53.

It will be recalled that unregulated sweep-excited high voltage power supplies of the type heretofore described have characteristically poor voltage regulation and were avoided in prior-art color television receivers partly because of the deleterious blooming effects which resulted from their use. The receiver shown in the figure includes a circuit for maintaining the vertical size of the reproduced image constant in the face of accelerating potential variations. This circuit comprises secondary winding 62, diode 63 and capacitor 64. The amplitude of the horizontal-rate pulses induced in winding 62, and hence the voltage developed across capacitor 64, depends on the current being drawn through secondary winding 51 by image reproducer 13. Under conditions of high brightness and reduced accelerating potential the current drawn is relatively large, the pulse amplitude is diminished, and the voltage developed across capacitor 64 is diminished. This voltage, when applied to vertical deflection circuit 16, decreases vertical scan by an amount just sufficient to compensate for the amount that the vertical scan would ordinarily have increased because of the decrease in accelerating potential.

The manner in which horizontal oscillator 30 is kept in synchronism with the received signal will now be considered. Negative polarity comparison pulses phase-related to the horizontal deflection signal in winding 48 are developed across secondary winding 58 and coupled through resistor 59 and capacitor 60 to the anode of diode 19. Resistor 59 and capacitor 61 form an integration network which integrates these pulses to form a sawtooth signal of approximately 5 volts peak-to-peak. This sawtooth signal is coupled by capacitor 60 to the anode of diode 19 so that it effectively appears across both diodes. As a result, each diode is biased conductive during alternate half cycles and no net error voltage is developed across terminals 25 and 27 of reactance control circuit 26 Horizontal synchronizing pulses, which convey horizontal synchronizing information from the received signal, are coupled from sync clipper 15 to juncture 21 by capacitor 29 and isolation resistor 28. Diodes 19 and 20 are forward biased to these pulses, and in the absence of other signals equal and opposite currents circulate through resistors 22 and 24 so that again no net error voltage is developed across terminals 25 and 27.

It follows then, that when the retrace portions of the comparison sawtooth signal and the synchronizing pulses derived in sync clipper 15 are applied in exact phase coincidence to the diodes, no net error voltage is developed across terminals 25 and 27. This condition can exist only when the horizontal scanning signal is in exact phase synchronism with the received signal, and when synchronism does not exist an error voltage is developed across diodes 19 and 20. This error voltage, the polarity of which depends on whether the horizontal deflection signal leads or lags the synchronizing pulse, is utilized by conventional circuitry in reactance control circuit 26 to bring oscillator 30 back into phase synchronism. Reactance control circuit 26 may include any of the well known anti-hunt and filtering circuits to better perform this function. Equalizing capacitor 23 is included in phase detector 18 to achieve a better balance between diodes 19 and 20 for the applied sawtooth comparison signal.

In accordance with the invention, the horizontal deflection system illustrated in the figure includes a novel compensating circuit 65 for overcoming the changes in raster size and position heretofore characteristic of unregulated high voltage power supplies for cathode-ray tube image reproducers. The circuit comprises a series-dropping resistor 66 interconnected between primary winding 46 and the negative unidirectional current source (—) which energizes transistor 39. Another resistor 67 is connected from the juncture of resistor 66 and winding 46 to juncture 21 of phase detector 18.

It will be recalled that the load presented by a cathode-ray tube image reproducer increases with the brightness of the reproduced image. In the case of the unregulated sweep-excited power supply included in dashed outline 36, this increased load is reflected back through primary winding 46 to the output circuit of transistor 39. The reflected load increase affects the operation of transistor 39 by causing an increase in the width of the recurrent retrace pulses developed at emitter 38. This width increase, which may exceed one micro-second, appears in the comparison pulses induced in winding 58. Phase detector circuit 18 undesirably responds to the increased width of these comparison pulses by generating a negative error voltage at terminal 25 of reactance control circuit 26. This error signal, if uncompensated for, would cause an annoying lateral shift in the reproduced image.

In operation, a negative polarity compensating potential is developed at the juncture of resistors 66 and 67 of a magnitude which depends on the current being drawn by transistor 39. A predetermined portion of this compensating potential is applied to juncture 21, and hence to terminal 25 of reactance control circuit 26, by means of a voltage divider network comprising resistors 67 and 24. For a predetermined increase in the brightness of the reproduced image, the heavier load placed on the sweep-excited high voltage power supply by image reproducer 13 causes a predetermined increase in the current in primary winding 46 and, in turn, a predetermined decrease in the negative compensating potential applied to terminal 25. By proper selection of resistors 66 and 67, the decrease in compensating potential at terminal 25 is made to exactly cancel out the negative error voltage otherwise developed by phase detector 18 because of changes in the width of the comparison pulse. Consequently, the net voltage appearing on terminal 25 remains constant at a predetermined negative value and the reproduced image suffers no lateral shift with changes in brightness.

The value of resistor 66 is dictated by its secondary function of providing width compensation to the horizontal output stage. In the present embodiment resistor 66 is approximately 17.5 ohms and has a power rating of 12 watts. The value of resistor 24 is determined largely by the characteristics of diode 20, and in practice is approximately 27,000 ohms. The only limitation on resistor 67 is that its impedance be sufficiently high to isolate juncture 21 from ground, and in the present embodiment this resistance is selected to be 680,000 ohms. This value provides the necessary voltage division for the compensating potential variation developed across resistor 66, which in practice is approximately 4.5 volts from no brightness to maximum brightness. It will be appreciated that although the compensating potential is shown applied to juncture 21, it could equally well be applied directly to treminal 25 by means of a suitable isolation network.

A second function of compensating circuit 65 is to maintain the width of the reproduced image constant in the face of fluctuations in accelerating potential. It has been shown that the current in winding 46, and hence the voltage drop across resistor 66, increases with the brightness of the reproduced image. An increase in the voltage drop across resistor 66, increases with the brightness of the reproduced image. An increase in the voltage drop across resistor 66 results in a lower operating voltage for transistor 39 and a decrease in the width of the reproduced image. It follows that for a predetermined increase in brightness level the operating voltage applied to transistor 39 is reduced by an amount dependent on the value of resistor 66. In acordance with the invention, resistor 66 is selected so that the reduction in operating voltage it brings about causes a decrease in width just sufficient to offset the width increase which would otherwise have resulted from the reduction in accelerating potential applied to image reproducer 13.

The inventive circuit, which utilizes only two passive impedance elements and adds little in the way of component cost, provides the key to elimination of the entire high voltage regulator circuit from color television receivers. Elimination of the regulator circuit, which, typically requires one or more vacuum tubes and adds substantially to the component cost of the finished product, makes possible a substantial reduction in the selling price of consumer color television receivers. With the present high volume of color receiver production, any such reduction in price would be of very great importance.

While a particular embodiment of the invention has been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

I claim:

1. A horizontal deflection system for use in a television receiver or the like adapted to receive composite television transmissions including horizontal synchronizing signals, said system comprising:

an image reproducer operable from an applied accelerating potential for reproducing an image having a predetermined range of brightness levels, said image reproducer having an ultor circuit in which the current varies directly with the brightness level of said reproduced image;

a high voltage power supply operable from an impressed horizontal deflection signal for generating said accelerating potential for application to said ultor circuit of said image reproducer;

a horizontal sweep output stage for generating a horizontal deflection signal for application to said high voltage power supply;

means coupled to said horizontal sweep output stage for deriving comparison pulses phase-dependent on said deflection signals but undesirably width-dependent on the current in said ultor circuit;

means comprising a phase detector circuit for generating a control effect representing the phase difference between said received synchronizing signals and said derived comparison pulses but undesirably dependent on width variations in said comparison pulses;

compensating means responsive to the current level in said ultor circuit for modifying the operation of said phase detector to render the control effect therefrom substantially independent of said comparison pulse width variations;

and synchronizing means coupled to said horizontal sweep output stage and responsive to said compensated control effect for maintaining said horizontal deflection signal in frequency and phase synchronism with said received composite television transmissions.

2. A horizontal deflection system as described in claim 1 in which said high voltage power supply is unregulated.

3. A horizontal deflection system as described in claim 1 in which said horizontal sweep output stage is operable from a unidirectional source of substantially constant potential and in which said compensating means comprises an impedance interconnected between said horizontal sweep output stage and said unidirectional source.

4. A horizontal deflection system as described in claim 3 wherein the image produced by said image reproducer is width-dependent on said applied accelerating potential and on said applied horizontal deflection signal, the accelerating potential produced by said high voltage power supply is undesirably dependent on and varies inversely with the brightness level of said reproduced image, said horizontal sweep output stage includes an electronic amplifier device having a gain dependent upon an applied unidirectional operating potential and further includes an output circuit in which the current varies directly with the brightness level of said reproduced image, and wherein are included means comprising said compensating impedance and responsive to variations in said output circuit current for applying a varying unidirectional operating potential to said amplifier device to cause its gain to vary inversely with variations in said brightness level and reduce the amplitude of said deflection signal with reduction of said accelerating potential so as to maintain the width of said reproduced image substantially constant and independent of brightness variations in said reproduced image.

5. A horizontal deflection system as described in claim 1 in which said high voltage power supply includes a fly-back transformer having a primary winding excited by said horizontal deflection signals from said horizontal sweep output stage and in which said means for deriving said comparison pulses comprises a secondary winding on said fly-back transformer.

6. A horizontal deflection system as described in claim 1 in which said horizontal deflection signal from said horizontal sweep output stage is phase and frequency dependent on an applied horizontal drive signal, and in which said synchronizing means comprises a horizontal oscillator for generating said horizontal drive signal and a reactance control stage coupled to said oscillator for varying its phase and frequency in response to variations in said compensated control effect.

References Cited

UNITED STATES PATENTS 3,200,288 8/1965 Tanner ------------- 315—27

RODNEY D. BENNETT, *Primary Examiner.*

T. H. TUBBESING, *Assistant Examiner.*